US007848785B2

United States Patent
Jung (10) Patent No.: US 7,848,785 B2
(45) Date of Patent: Dec. 7, 2010

(54) KEYPAD ASSEMBLY FOR A MOBILE TERMINAL

(75) Inventor: Sun Mi Jung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 608 days.

(21) Appl. No.: 11/939,526

(22) Filed: Nov. 13, 2007

(65) Prior Publication Data

US 2008/0113695 A1    May 15, 2008

(30) Foreign Application Priority Data

Nov. 14, 2006    (KR) ............... 10-2006-0112159

(51) Int. Cl.
*H04M 1/00* (2006.01)
(52) U.S. Cl. ................ 455/575.1; 455/90.3; 455/128; 455/3.06; 345/169
(58) Field of Classification Search .......... 455/575.1, 455/90.3, 128, 3.06, 501, 63.1, 222, 283; 345/169, 173; 361/681
See application file for complete search history.

(56) References Cited

U.S. PATENT DOCUMENTS

| | | | |
|---|---|---|---|
| 5,722,055 A * | 2/1998 | Kobayashi et al. ....... | 455/575.8 |
| 5,999,821 A | 12/1999 | Kaschke | |
| 6,052,464 A * | 4/2000 | Harris et al. ........... | 379/433.07 |
| 6,137,883 A * | 10/2000 | Kaschke et al. ........ | 379/433.07 |
| 6,463,263 B1 * | 10/2002 | Feilner et al. .............. | 455/90.1 |
| 6,728,555 B1 * | 4/2004 | Pirila et al. ................. | 455/566 |
| 7,243,851 B2 * | 7/2007 | Zhu et al. ............. | 235/472.02 |
| 7,327,547 B1 * | 2/2008 | Epstein ...................... | 361/212 |
| 7,328,047 B2 * | 2/2008 | Zhu et al. ................... | 455/566 |
| 7,349,723 B2 * | 3/2008 | MacIntosh et al. ....... | 455/575.1 |
| 7,444,174 B2 * | 10/2008 | Zhu et al. ............... | 455/575.1 |
| 2009/0011804 A1 * | 1/2009 | Zhu et al. ............... | 455/575.1 |
| 2009/0296674 A1 * | 12/2009 | Ekl et al. .................... | 370/338 |
| 2010/0105345 A1 * | 4/2010 | Thampi et al. ............. | 455/214 |
| 2010/0203929 A1 * | 8/2010 | Skagmo et al. .......... | 455/575.1 |

FOREIGN PATENT DOCUMENTS

| | | |
|---|---|---|
| CN | 1722740 | 1/2006 |
| EP | 1601168 | 11/2005 |
| JP | 2004343267 | 12/2004 |
| WO | 2005/061204 | 7/2005 |

* cited by examiner

*Primary Examiner*—Minh D Dao
(74) *Attorney, Agent, or Firm*—Lee, Hong, Degerman, Kang & Waimey (57) ABSTRACT

A keypad assembly for a mobile terminal includes a shielding element to prevent sound leakage from or into a sound port that is used to guide sound to a terminal microphone. A mobile terminal may include a printed circuit board (PCB) coupled to a keypad assembly and mounted within a case or housing, wherein a microphone is integral with the PCB. The shielding element is located between the microphone and the terminal case to form part of the sound port, and may be integrated with the keypad assembly.

25 Claims, 7 Drawing Sheets

KEYPAD ASSEMBLY FOR A MOBILE TERMINAL

CROSS REFERENCE TO RELATED APPLICATION

Pursuant to 35 U.S.C. §119(a), this application claims the benefit of earlier filing date and right of priority to Korean Patent Application No. 10-2006-0112159, filed on Nov. 14, 2006, the contents of which are hereby incorporated by reference in their entirety.

FIELD OF THE INVENTION

The present invention relates to a keypad assembly, and more particularly, to a keypad assembly capable of preventing sound from leaking from or into a sound port used for directing sound to a microphone installed in a mobile terminal.

DISCUSSION OF THE RELATED ART

Generally, mobile terminals include mobile phones, PDAs, and the like, which are hand-held wireless communication devices capable of allowing individuals to exchange images, voice communications, and text messages, or to use a variety of services over network connections.

Recently, mobile terminals include many more functions than the basic function of providing simple communication similar to telephones. Current terminals include advanced features such as a game player, a MP3 file player, a digital camera, a video on demand (VOD) player, and an electrical dictionary.

Terminals have been developed into a variety of shapes including bar-type, flip-type, folder-type, and slide-type terminals. Consumers prefer smaller and lighter terminals, and the thickness of the terminals has been increasingly reduced. Very thin bar-type terminals are now sold.

Figure 1:
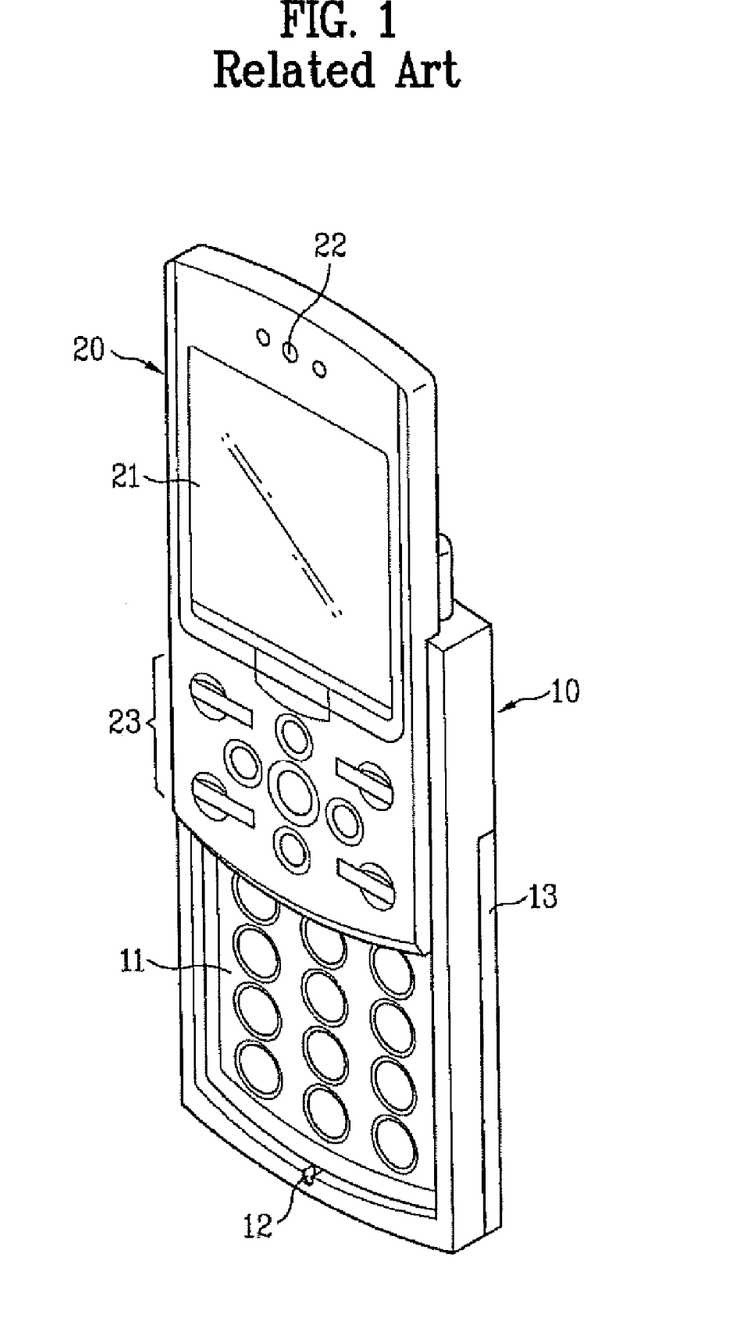
FIG. 1 is a perspective view of a conventional mobile terminal.
Figure 2:
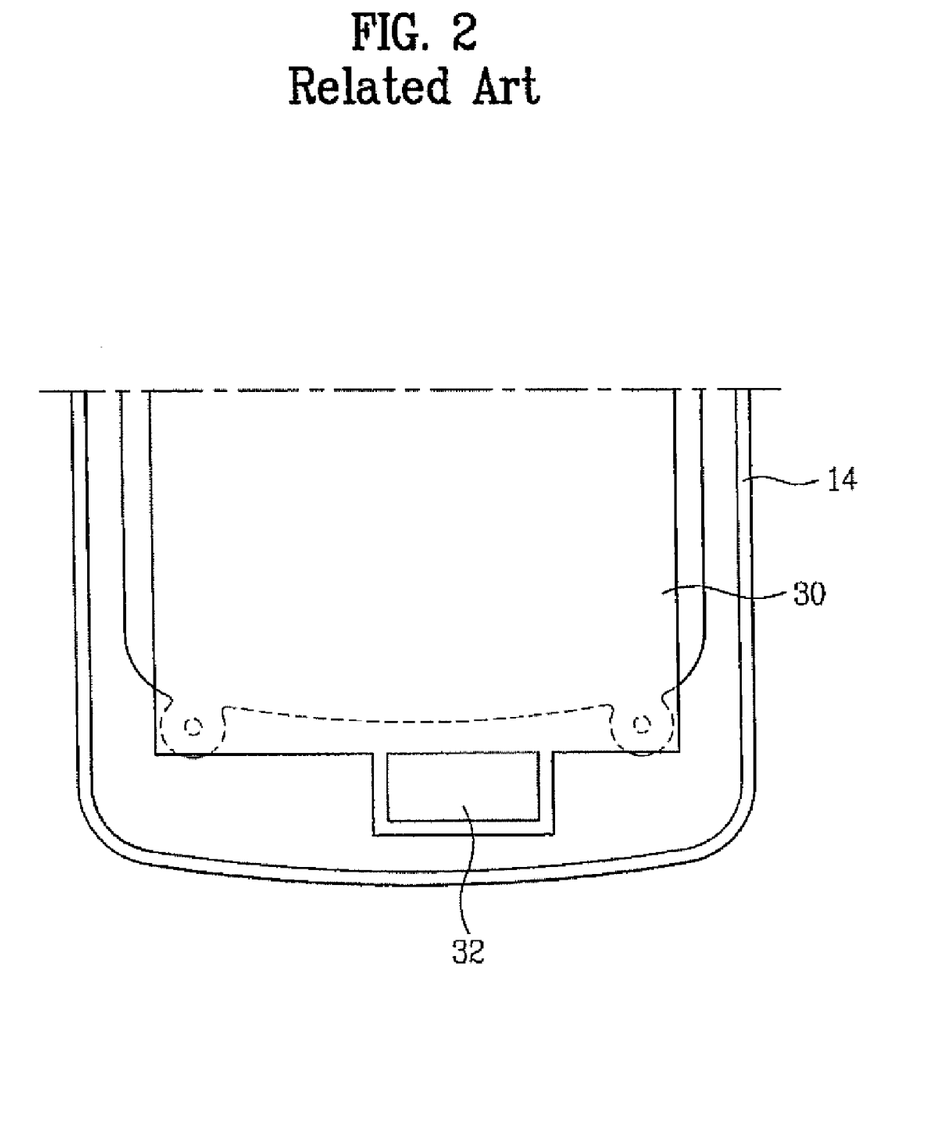
FIG. 2 is a plan view showing a microphone installed in the conventional mobile terminal.

Referring to FIGS. 1 and 2, a conventional slide-type terminal comprises a main body 10 including a keypad 11 for text input, and a sliding cover 20 coupled to a front surface of the main body 10, wherein the sliding cover 20 slides over the main body 10.

The main body 10 has a battery 13 coupled to a rear surface and a microphone opening 12 for receiving voice signals. The sliding cover 20 has a liquid crystal screen 21 for displaying an image, an speaker opening 22 for providing sound output, and function keys 23 to execute special functions.

To have a conversation using the slide-type terminal, the sliding cover 20 is opened exposing the keypad 11 and the microphone opening 12. A call is initiated by providing calling numbers using the keypad 11, and when connected, a conversation is accomplished using the microphone opening 12 and the speaker opening 22.

In the above description, a microphone 32 is mounted on a circuit board 30 at a position below the microphone opening 12. The microphone 32 serves to convert sound, guided into the microphone 32 through the microphone opening 12, into electrical signals. When a gap exists between the microphone opening 12 and the microphone 32, sound may leak from this gap. That is, a voice conversation may leak from the gap between the microphone opening 12 and the microphone 32 into the interior of the main body 10 rather than being wholly introduced into the microphone 32. This creates the problem of attenuating the sound volume transmitted to the microphone 32.

Furthermore, sound from the speaker (not shown) may leak from a similar gap beneath the speaker opening 22 may be transmitted to the microphone 32 by passing through interior portion of the sliding cover 20 and the main body 10 thereby causing feedback to the other party. This feedback causes the other party to hear an echo of his voice transmitted by microphone 22.

SUMMARY OF THE INVENTION

Accordingly, the present invention is directed to a keypad assembly and a mobile terminal using the keypad assembly that substantially overcome one or more problems due to limitations and disadvantages of the related art.

An object of the present invention is to provide a keypad assembly capable of preventing sound leaking into or from a sound guide. A shielding element may be integrally formed with the keypad assembly.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one embodiment, a keypad assembly includes a keypad having user input keys, and a sound port formed in the keypad and configured to direct sound to a microphone. The keypad assembly also includes a shielding element cooperating with the sound port and which is configured to direct sound to the microphone, wherein the shielding element is located between the keypad and the microphone. The shielding element may be located relative to a portion of a top side of the microphone and extending along at least a portion of a side or sides of the microphone. The shielding element is configured to fill at least a portion of a gap between the keypad and a printed circuit board.

The shielding element may be located between the keypad and a first side of a printed circuit board (PCB) and may be configured to direct the sound to the microphone located on a second side of the PCB.

The shielding element may be integrally formed with the keypad, or may be a separate member configured to be attached to the keypad.

The user input keys form a two-dimensional array of keys, and the sound port may be located between adjacent keys of the input keys.

In another embodiment, a mobile terminal includes a circuitry supporting substrate having circuitry for implementing functions associated with the mobile terminal, a microphone coupled to the circuit board and configured to receive sound, and a keypad assembly configured to cooperate with the circuitry supporting substrate and microphone, wherein the keypad assembly has a keypad comprising user input keys and a first sound port formed in the keypad and configured to direct sound to the microphone. The microphone may be coupled to either a top side or a lower side of the circuitry supporting substrate.

The terminal may also include a second sound port formed in the circuitry supporting substrate, in which the second sound port is located to cooperate with the first sound port and is configured to direct the sound to the microphone.

The keypad assembly further includes a shielding element cooperating with the first sound port and which is configured to direct the sound to the microphone, in which the shielding element is located relative to a portion of a top side of the microphone and extending along at least a portion of a side or sides of the microphone. The shielding element is located between the keypad and the microphone, and is formed to fill at least a portion of a gap between the keypad and a printed circuit board. The shielding element may be integrally formed with the keypad or may be a separate member configured to be attached to the keypad.

The user input keys form a two-dimensional array of keys, and the first sound port may be located between adjacent keys of the input keys.

The terminal may also include a housing for enclosing the circuitry supporting substrate, the microphone, and the keypad assembly, and a second sound port formed in the housing and configured to cooperate with the first sound port to direct the sound to the microphone.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

Referring to FIGS. 3 to 6, a keypad assembly, according to one embodiment of the present invention, comprises a keypad 150, at least one sound port 130 located on the keypad 150 and used to guide sound to a microphone 120, and a shielding element 140 filling a gap between the microphone 120 and the sound port 130. The shielding element 140 prevents sound leaking into the microphone 120 from the main body 100.

Figure 3:
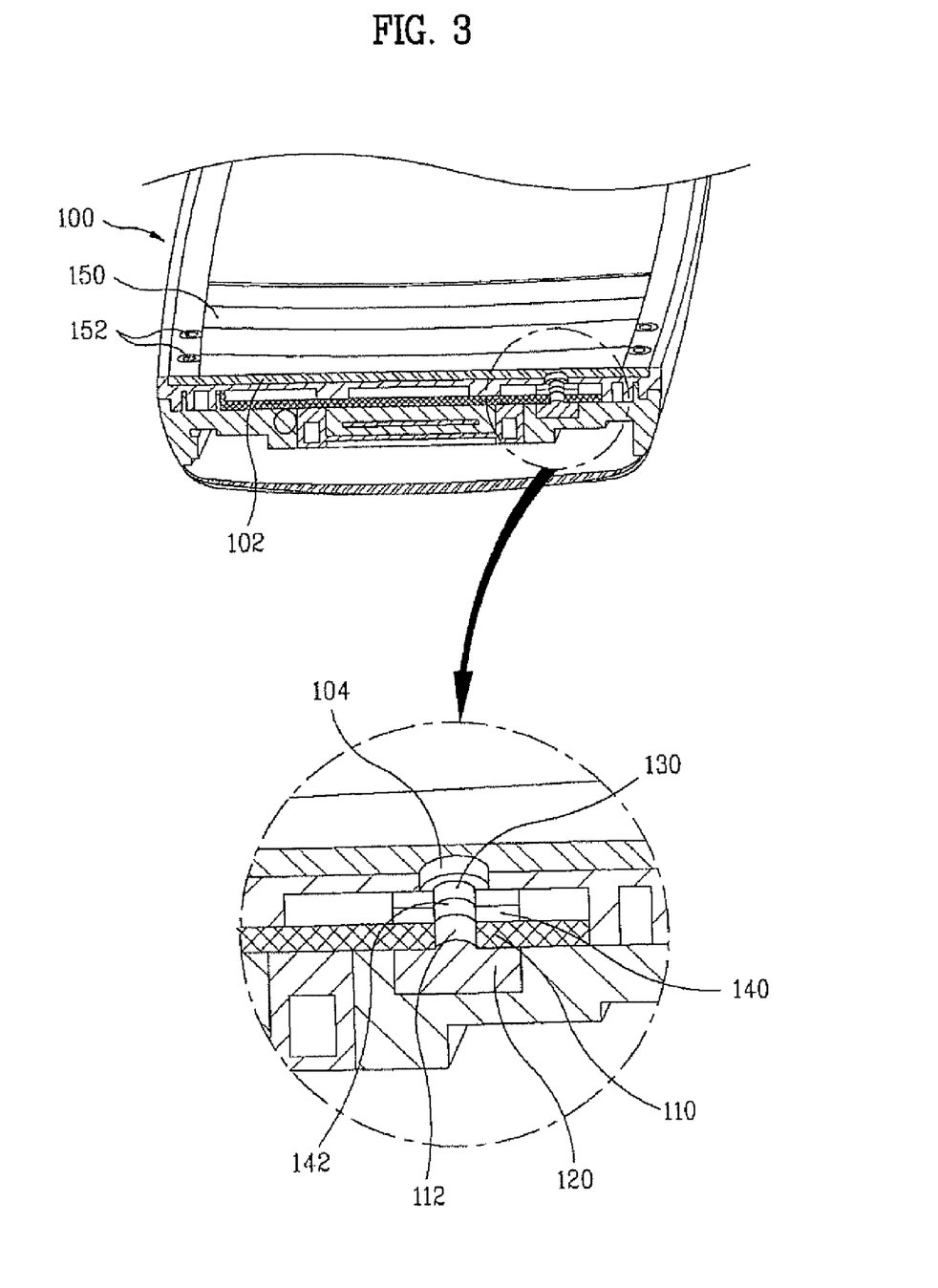
FIG. 3 is a sectional perspective view illustrating a shielding element of the terminal according to one embodiment of the present invention.
Figure 4:
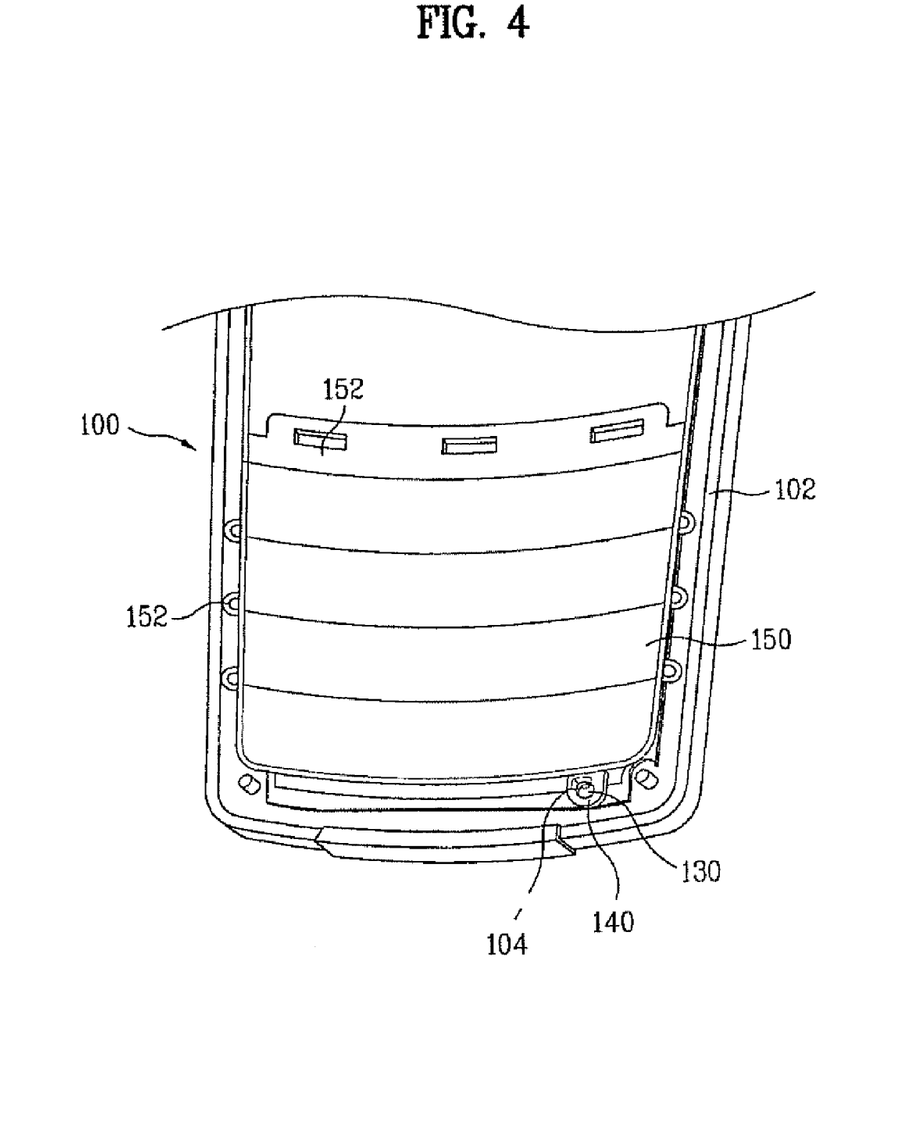
FIG. 4 is a plan view of the mobile terminal of FIG. 3.

A terminal having the keypad assembly comprises a circuit board 110 having electronic components implementing the terminal functions, the microphone 120 located on the circuit board 110 to receive sound, and the keypad assembly provided on an upper portion of the circuit board 110.

Although one embodiment of the present invention will be described based on the configuration provided on a main body 100 of a slide-type terminal, it should be understood that the configuration may be provided on a sliding cover (not shown) rather than the main body 100. The configuration described above also may be applicable to other types of terminals, including folder-type and bar-type terminals.

The microphone 120 is located on the circuit board 110 and converts sound into electrical signals. The microphone may be located separately from but electrically connected to the circuit board 110. A small-size high-performance semiconductor microphone 120 may be used.

When the microphone 120 is installed on the circuit board 110, the microphone 120 is typically attached to a lower surface of the circuit board 110. Such an arrangement minimizes the overall thickness of the terminal. An alternative configuration, in which the microphone 120 is mounted on another position of the circuit board 110, will be described later with respect to another embodiment.

The sound port 130 is provided to guide external sound to the microphone 120. To prevent the leakage of sound being introduced into the microphone 120, the shielding element 140 is provided to fill the gap between the microphone 120 and the sound port 130.

The shielding element 140 seals the sound path thereby preventing sound leakage and eliminates attenuation of the sound transmission. Further, the shielding element prevents extraneous sound from entering the sound path and effectively eliminates feedback from the speaker (not shown) to the microphone 120.

The shielding element 140 has a first hole 142 for allowing the sound, introduced into the sound port 130, to be transmitted to the microphone 120. The first hole 142 of the shielding element 140 defines the sound path while preventing sound leakage into or from the first hole 142.

The circuit board 110 has a second hole 112 near the microphone 120. The second hole 112 allows the sound to be transmitted through the upper and lower surfaces of the circuit board 110. Since the microphone 120 is attached to the lower surface of the circuit board 110, preferably, the second hole 112 is formed at a position of the circuit board 110 corresponding to the microphone 120 in order to guide sound into the microphone 120.

In this embodiment, the shielding element 140 is provided in a gap between the upper surface of the circuit board 110 and the sound port 130, thereby preventing the sound leakage into the microphone 120. The sound port 130 may be a perforation in the case 102 that forms the outer surface of the main body 100. In this case, the sound port 130 is exposed to the outside similar to a conventional microphone opening, and serves to guide sound.

However, according to one embodiment, the sound port 130 is preferably integrated with the keypad 150. When the sound port 130 is integrated with the keypad 150, a microphone opening 104 is provided in the case 102 at a position corresponding to the sound port 130, enabling the sound port 130 to communicate with the outside.

Figure 5:
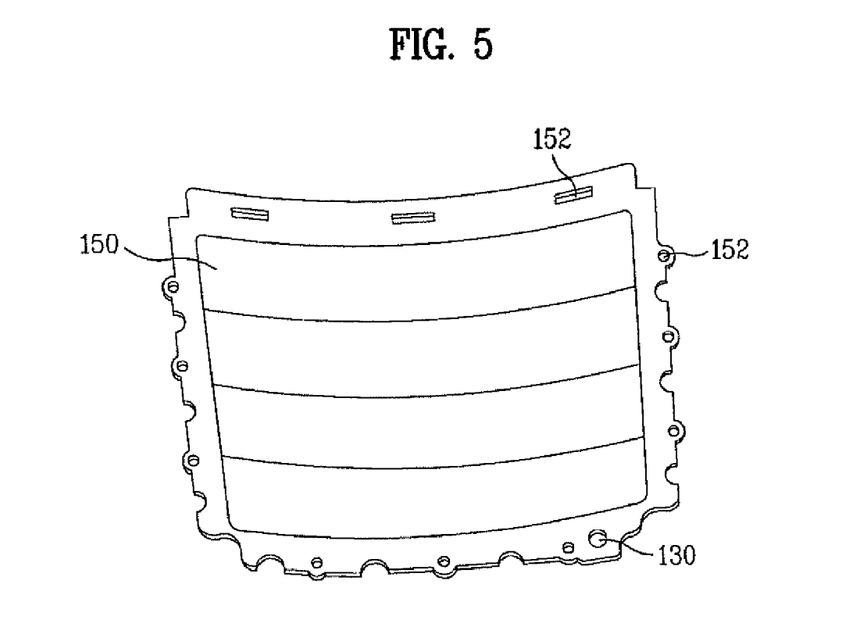
FIG. 5 is a plan view illustrating a keypad assembly having a shielding element according to one embodiment of the present invention.
Figure 6:
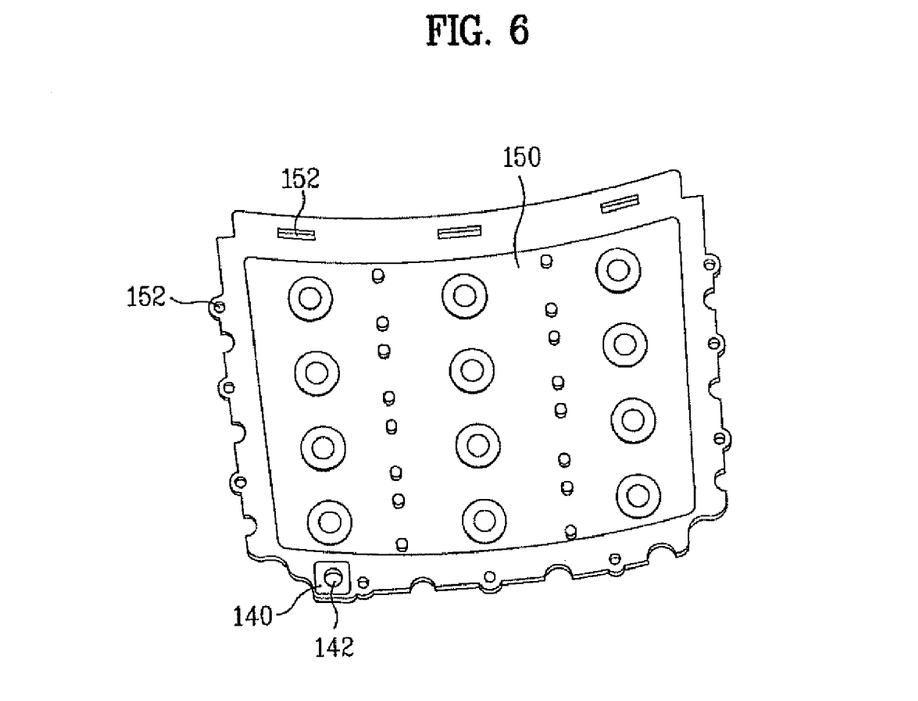
FIG. 6 is a bottom view of the keypad assembly shown in FIG. 5.

As shown in FIGS. 5 and 6, the keypad 150, sound port 130, and shielding element 140 may constitute a single keypad assembly. Specifically, the sound port 130 may be located in a lower portion of the keypad 150. A plurality of keypad fixing holes 152 are arranged along the periphery of the keypad 150. The keypad fixing holes 152 are engaged with protrusions (not shown) formed in the circuit board 110 or case 102, to secure the keypad 150 at a fixed position. The position of the sound port 130 may be appropriately selected so as not to overlap with the keypad fixing holes 152.

Here, the sound port 130 can be provided at various desired positions on the keypad 150, for example, at the middle of the lower portion or the left or right distal end of the lower portion of the keypad 150, or the center portion of the keypad 150. The position of the sound port 130 can be appropriately selected so as not to interfere with the key input operation of the keypad 150. Then, positions of the shielding element 140, microphone 120, first hole 142, and second hole 112 are determined to correspond to the position of the sound port 130.

The shielding element 140 may be integrally formed with the keypad 150. Specifically, the shielding element 140 may be integrally formed at the lower surface of the keypad 150 at the same position as the sound port 130. For example, if the keypad 150 is fabricated by insert injection molding, the shielding element 140 is also fabricated by injection molding together with the keypad 150 and thus, can be integrally formed at a position of the keypad 150.

If the shielding element 140 is integrally formed with the keypad 150, attachment and alignment errors are eliminated thereby reducing assembly interference problems. The shielding element 140 also may be prepared as a separate member and attached to the lower surface of the keypad 150 using an adhesive or other method of fastening.

Whether the shielding element 140 is integrally formed or prepared as the separate member to be attached as described above, the shielding element 140 is fixedly mounted along with the keypad 150 in the course of assembling the terminal. Therefore, by carefully inserting the keypad fixing holes 152 on the protrusions of the keypad 150 or case 102, the sound port 130, first hole 142, and second hole 112 can be aligned.

As described above, manufacturing and assembling the keypad 150, sound port 130, and shielding element 140 as a single assembly has the advantages of reducing the rate of defective products and increasing the convenience and accuracy of overall assembly.

A plurality of first holes 142 may be perforated in the shielding element 140 to diversify the path of sound. Of course, it is preferable that, when the plurality of first holes 142 is provided, a plurality of second holes 112 and a plurality of sound ports 130 be provided corresponding to the number of the first holes 142.

The shielding element 140 may be made of a flexible material and when integrally formed with the keypad 150, the shielding element 140 may be made of the same material as that of the keypad 150.

Preferably, the shielding element 140 has a thickness larger than the distance between the upper surface of the circuit board 110 and the sound port 130. With this configuration, when the shielding element 140 is assembled together with the keypad 150, the circuit board 110, and the case 102, the shielding element 140 is compressed between the circuit board 110 and the sound port 130. Since the shielding element 140 is made of a flexible material, the shielding element 140 can come into close contact with contact surfaces of both the circuit board 110 and the sound port 130. As a result, the leakage of sound can be more efficiently prevented.

The case 102 is assembled such that the microphone opening 104 and the sound port 130 are in close contact with each other allowing sound to be guided through the microphone opening 104, sound port 130, first hole 142, and the second hole 112, and introduced into the microphone 120 without the possibility of leakage.

The shape of the shielding element 140 can be changed to conform to the installation space. Although the shielding element 140 is illustrated with a rectangular cross section when viewed from a direction parallel to the keypad 150, other polygonal or circular cross sectional shapes are also possible.

Figure 7:
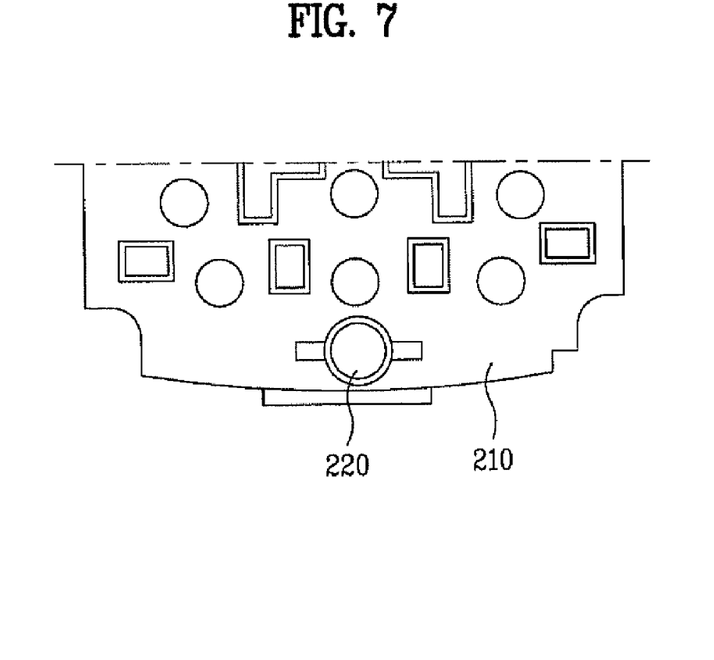
FIG. 7 is a plan view of a circuit board having a microphone according to another embodiment of the present invention.
Figure 8:
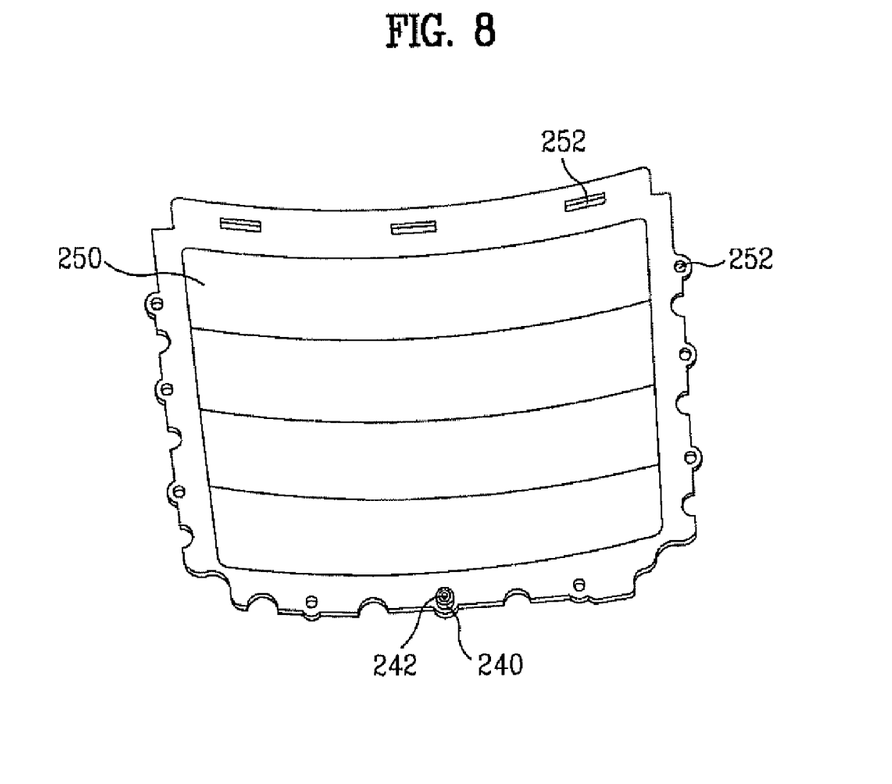
FIG. 8 is a plan view of a keypad having a shielding element as shown in FIG. 7.
Figure 9:
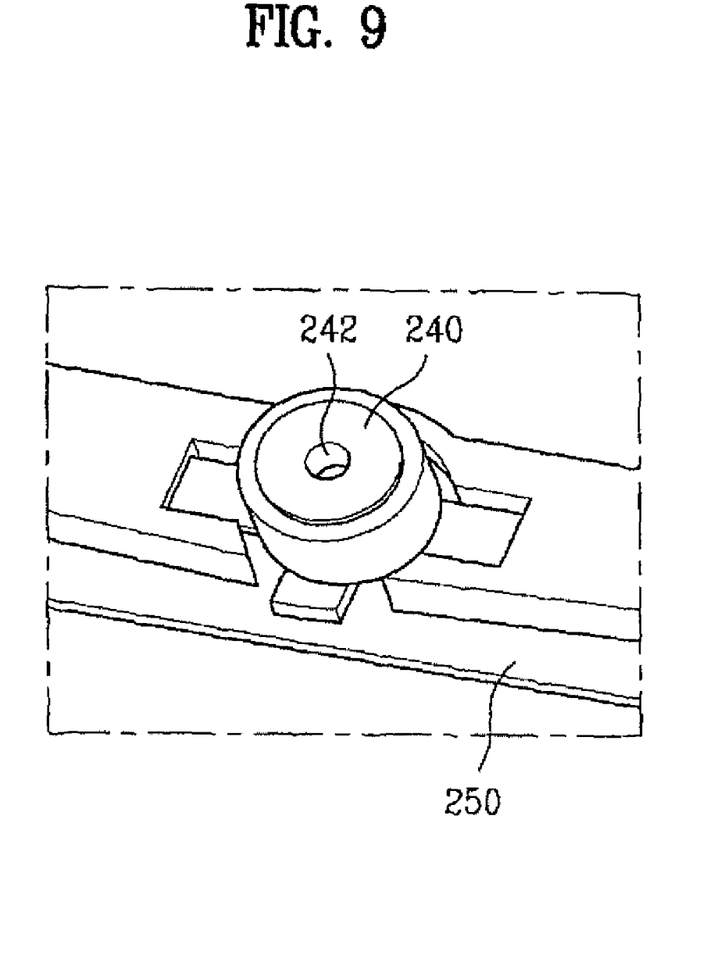
FIG. 9 is a partial enlarged view showing the installation of a shielding element associated with the microphone of FIG. 8.

Another embodiment is described with reference to FIGS. 7 to 9. A microphone 220 according to one embodiment is attached to the upper surface of the circuit board 210. Although shown at the center of the circuit board 210, the microphone 220 may be located according to design requirements.

When the microphone 220 is located on the upper surface of the circuit board 210, the shielding element 240 is configured to cover a portion of the microphone 220 extending upward from the upper surface of the circuit board 210.

Similarly, the shielding element 240 may be provided on a keypad 250. The shielding element 240 may be in the form of a cap protruding from the upper surface of the keypad 250, to cover the microphone 220.

The keypad 250 in this embodiment has substantially the same configuration as the previous embodiment except for the configuration of the shielding element 240. Accordingly, other elements of the keypad 250 including, for example, keypad fixing holes 252, are identical to those of the previous embodiment.

Meanwhile, in the present embodiment, it is preferable that a sound port (not shown) be formed in a case (not shown) forming the outer appearance of the terminal body. The sound port is located above the shielding element 240 when assembled in the case. When completely assembled, the sound port is in close contact with the shielding element 240. The shielding element 240 has a first hole 242 allowing sound to be introduced into the sound port and transmitted to the microphone 220.

In conclusion, the sound port and the first hole 242 are aligned, and sound is transmitted to the microphone 220 along the sound path defined by both the sound port and the first hole 242. In this case, the shielding element 240 seals a gap between the sound port and the microphone 220 preventing sound leakage. The shielding element 240 has a thickness sufficient to seal the gap between the sound port and the microphone 220.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal, comprising:
 a circuitry supporting substrate comprising circuitry for implementing functions associated with the mobile terminal;
 a microphone coupled to a lower side of the circuitry supporting substrate and configured to receive sound;
 a keypad assembly configured to cooperate with the circuitry supporting substrate and microphone, wherein the keypad assembly comprises:
 a keypad comprising user input keys; and
 a first sound port formed in the keypad and configured to direct sound to the microphone; and
 wherein the mobile terminal further comprises a second sound port formed in the circuitry supporting substrate, wherein the second sound port is located to cooperate with the first sound port and is configured to direct the sound to the microphone.

2. The mobile terminal according to claim 1, further comprising:
a housing for enclosing the circuitry supporting substrate, the microphone, and the keypad assembly; and
a third sound port formed in the housing and configured to cooperate with the first and second sound ports to direct the sound to the microphone.

3. The mobile terminal according to claim 1, wherein the keypad assembly further comprises:
a shielding element located between the keypad and a first side of the circuitry supporting substrate and which is configured to direct the sound to the microphone which is located on the lower side of the circuitry supporting substrate.

4. A mobile terminal, comprising:
a circuitry supporting substrate comprising circuitry for implementing functions associated with the mobile terminal, wherein the substrate comprises a top side and a bottom side and is structured to define a first aperture;
a keypad comprising a plurality of keys, wherein the keypad is structured to define a second aperture;
a shielding element being structured to define an aperture therein, wherein the shielding element is positioned relative to a bottom side of the keypad and is located so that the aperture of the shielding element cooperates with the first aperture of the substrate and the second aperture of the keypad to permit passage of sound therethrough; and
a microphone positioned relative to the bottom side of the substrate and positioned relative to the first aperture.

5. The mobile terminal according to claim 4, wherein the shielding element comprises a generally circular shape.

6. The mobile terminal according to claim 4, wherein the second aperture of the keypad is located at an outer region of the keypad, the location of the second aperture being positioned at an area between the plurality of keys and an edge of the keypad.

7. The mobile terminal according to claim 4, wherein the keypad comprises a plurality of fixing holes located proximate to outer edges of the keypad, wherein each of the plurality of fixing holes is sized to receive a protrusion to permit mounting of the keypad.

8. The mobile terminal according to claim 7, wherein each of the protrusions extend from a case sized to receive the keypad.

9. The mobile terminal according to claim 7, wherein each of the protrusions extend from the circuitry supporting substrate.

10. The mobile terminal according to claim 4, wherein the shielding element comprises an outer perimeter side which is fully exposed to a cavity defined within the mobile terminal.

11. The mobile terminal according to claim 4, wherein the first aperture, the second aperture, and the aperture of the shielding element are generally aligned to facilitate the passage of sound therethrough.

12. The mobile terminal according to claim 4, wherein the microphone is coupled to the bottom side of the substrate.

13. The mobile terminal according to claim 4, wherein the shielding element is coupled to the bottom side of the keypad.

14. The mobile terminal according to claim 4, wherein the keypad and the shielding element are integrated.

15. The mobile terminal according to claim 4, wherein the keypad and the shielding element comprise materials which are the same.

16. The mobile terminal according to claim 4, wherein the shielding element is coupled to the circuitry supporting substrate.

17. The mobile terminal according to claim 4, wherein the keypad causes generation of signals responsive to user contact to an exposed top side of the keypad, and wherein the shielding element is coupled to the bottom side of the keypad.

18. The mobile terminal according to claim 4, wherein the shielding element is structured to be compressible between the keypad and the substrate.

19. The mobile terminal according to claim 4, wherein individual touch keys of the keypad are bound by a left edge, a right edge, and a lower edge of the keypad, and wherein the second aperture is located at a right side of the lower edge and positioned so that it is at an offset relative to two adjacent rows of the individual touch keys of the keypad.

20. A mobile terminal, comprising:
a circuitry supporting substrate comprising circuitry for implementing functions associated with the mobile terminal, wherein the substrate comprises a top side and a bottom side and is structured to define a first aperture;
a keypad comprising a plurality of keys, wherein the keypad is structured to define a second aperture;
a shielding element coupled to the bottom side of the keypad and structured to define an aperture therein, wherein the shielding element comprises an outer perimeter side which is fully exposed to a cavity defined within the mobile terminal, wherein the shielding element is located so that the aperture of the shielding element cooperates with the first aperture of the substrate and the second aperture of the keypad to permit passage of sound therethrough, and wherein the first aperture, the second aperture, and the aperture of the shielding element are generally aligned to facilitate the passage of sound therethrough; and
a microphone coupled to the bottom side of the substrate and positioned relative to the first aperture.

21. The mobile terminal according to claim 20, wherein the shielding element comprises a generally circular shape.

22. The mobile terminal according to claim 20, wherein the second aperture of the keypad is located at an outer region of the keypad, the location of the second aperture being positioned at an area between the plurality of keys and an edge of the keypad.

23. The mobile terminal according to claim 20, wherein the keypad comprises a plurality of fixing holes located proximate to outer edges of the keypad, wherein each of the plurality of fixing holes is sized to receive a protrusion to permit mounting of the keypad.

24. The mobile terminal according to claim 20, wherein the shielding element is structured to be compressible between the keypad and the substrate.

25. The mobile terminal according to claim 20, wherein individual touch keys of the keypad are bound by a left edge, a right edge, and a lower edge of the keypad, and wherein the second aperture is located at a right side of the lower edge and positioned so that it is at an offset relative to two adjacent rows of the individual touch keys of the keypad.

* * * * *